3,274,140
PRODUCTION OF POLYMER SOLUTIONS
Graham John Brealey, Coventry, England, assignor to Courtaulds Limited, London, England, a British company
No Drawing. Filed Nov. 19, 1962, Ser. No. 238,770
Claims priority, application Great Britain, Nov. 28, 1961, 42,438/61
5 Claims. (Cl. 260—29.6)

This invention is concerned with the production of solutions of polyacrylonitrile suitable immediately for using to form shaped articles, for example fibres and films. By "polyacrylonitrile" we mean both homopolymers of acrylonitrile and also copolymers containing at least 80 percent by weight of acrylonitrile units. Such copolymers may be the products of copolymerisation with acrylonitrile of such other monomers as styrene, methyl acrylate, itaconic acid, methallyl sulphonic acid and its salts, vinyl acetate and vinyl pyridine. The invention is particularly suitable for the production of copolymers containing 90 to 95 percent by weight of acrylonitrile units.

A difficulty which has always been observed when acrylonitrile is polymerised in solution in inorganic thiocyanate solutions using initiators which form free radicals, is that the polymer solutions obtained, and in turn the shaped articles formed from those solutions, tend to be discoloured. It is therefore an object of this invention to make it possible to obtain by this method solutions and shaped articles which are less discoloured.

According to the present invention, the polymerisation in an inorganic thiocyanate solution and in the presence of a free-radical-forming initiator is carried out in the presence also of a secondary alcohol containing from 3 to 5 carbon atoms. Typical free-radical-forming initiators are the so-called "azo-catalysts," which are usually employed at temperatures of at least 50° C.

The effect of the secondary alcohol, which apparently functions in this process as a chain transfer agent, is to yield in solution a polyacrylonitrile having a lower molecular weight than would otherwise be obtained. By varying those reaction conditions which tend simultaneously to increase the molecular weight of the polymer obtained and to give rise to a less discoloured product, it is possible to restore the moleculer weight to its original value and simultaneously to obtain a product of improved colour.

Two reaction conditions falling in this class are a decrease in the quantity of the initiator and a lowering of the polymerisation temperature. Thus by polymerising in the presence of the secondary alcohol one is able to employ less initiator and/or lower reaction temperatures and so to obtain a polymer of unchanged molecular weight in a solution yielding fibres of improved colour.

Secondary alcohols which may be employed are isopropyl alcohol, secondary butyl alcohol and secondary amyl alcohol. The quantity of the chosen alcohol which is incorporated in the polymerisation solution may amount to between 0.05 and 2.0 percent by weight of the total weight of the polymerisation solution. When isopropyl alcohol or secondary butyl alcohol is employed, it is preferred to use from 0.2 to 1.5 percent of the alcohol, while rather more secondary amyl alcohol is necessary to obtain an equivalent effect. The preferred quantity of the latter alcohol is therefore 0.4 to 2.0 percent of the polymerisation solution by weight.

The invention will now be illustrated by means of the following examples, in which percentages are by weight unless specified otherwise. In all of the examples, the monomer mixture comprises acrylonitrile, methyl acrylate and itaconic acid in the weight propertions of 93:6:1, dissolved in an aqueous solution of sodium thiocyanate containing 50 percent by weight of sodium thiocyanate. The fibre colour in each case has been expressed as fibre yellowness (Y) obtained from the equation:

$$Y = \frac{R-B}{G}$$

where R, B and G are the reflectance ratios in red, blue and green respectively, as measured on the "Colormaster" differential colorimeter.

Throughout the examples, the quantity of initiator has been quoted as a percentage based on the total weight of the monomers, while the quantity of secondary alcohol is given as a percentage calculated on the total weight of the polymerisation mixture.

Example 1

Three polymerisations were carried out continuously in a stirred reactor. The monomer mixture in each case was a 16 percent solution in sodium thiocyanate solution and the polymerisation temperature was 80° C. In two of the polymerisations, a quantity of isopropyl alcohol was incorporated in the polymerisation solution and in those two cases decreased quantities of the azo initiator were used. In order to ensure the same percentage conversion of monomer to polymer, an increased polymerisation time was adopted. The following table shows the improvement in fibre colour obtained:

| Quantity of isopropyl alcohol (Percent) | Quantity of azo-bis-isobutyronitrile (percent) | Times (minutes) | Fibre Yellowness |
|---|---|---|---|
| 0 | 0.80 | 69 | 0.130 |
| 0.5 | 0.563 | 85 | 0.112 |
| 0.5 | 0.448 | 102 | 0.091 |

Example 2

Four experiments were carried out in which a monomer solution containing 22 percent of monomers and 0.50 percent of azo-bis-isobutyronitrile was polymerised for 100 minutes at 80° C. The polymer solution obtained when no secondary alcohol was present had an intrinsic viscosity which was so high that the solution was unspinnable. When, however, the polymerisation was repeated with progressively decreased amounts of azo-bis-isobutyronitrile as initiator and in the presence of 0.45 percent of isopropyl alcohol, solutions of progressively improving colour were obtained. The following table gives the colour of fibres spun from the polymer solutions:

| Quantity of initiator (percent) | Fibre Yellowness |
|---|---|
| 0.364 | 0.077 |
| 0.304 | 0.070 |
| 0.247 | 0.052 |

Example 3

The four polymerisations listed in the following table were carried out for 69 minutes 80° C. The quantity of initiator was progressively decreased and, to compensate for the progressive decrease in monomer-to-polymer conversion which would otherwise result, the total concentration of monomers was in turn increased.

| Quantity of azo-bis-isobutyro-nitrile (percent) | Concentration of monomers in solution (percent) | Quantity of isopropyl alcohol (percent) | Fibre Yellowness |
|---|---|---|---|
| 1.14 | 14 | 0 | 0.130 |
| 0.75 | 16 | 0.63 | 0.101 |
| 0.489 | 18 | 0.94 | 0.094 |
| 0.34 | 20 | 1.26 | 0.077 |

*Example 4*

A 16 percent solution of the monomer mixture in sodium thiocyanate solution was polymerised for 100 minutes at 80° C., firstly without any secondary alcohol present. The polymerisation was then repeated in the presence of secondary butyl alcohol and secondary amyl alcohol respectively. The following results were obtained:

| Quantity of secondary alcohol (percent) | Quantity of initiator (percent) | Fibre Yellowness |
|---|---|---|
| 0 | 0.903 | 0.105 |
| 0.65 amyl | 0.750 | 0.087 |
| 0.55 butyl | 0.448 | 0.091 |

*Example 5*

A 16 percent solution of the monomer mixture containing 0.45 percent of azo-bis-isobutyronitrile was polymerised for 86 minutes at 85° C. The polymer solution obtained was spun to give fibres having a fibre yellowness of 0.100. The experiment was then repeated with 0.5 percent of isopropyl alcohol in the mixture and the polymerisation temperature was decreased to 80° C. The solution obtained after 102 minutes was spun and the yellowness of the fibre obtained was 0.090.

To summarize the conclusions which may be drawn from the above examples, the presence of the secondary alcohol does not in itself improve the colour of the fibre which may be spun from the polymer solutions obtained. It does, however, make possible a decrease in initiator quantity or in polymerisation temperature, which decreases in turn lead to the desired improvements in colour.

What I claim is:

1. In the production of solutions of acrylonitrile polymers containing at least 80 percent by weight of acrylonitrile units by dissolving a polymerisable material containing such a quantity of acrylonitrile as is necessary to give the desired polymer in an aqueous solution of an inorganic thiocyanate and polymerising said polymerisable material in the presence of a free-radical-forming initiator, the improvement which comprises carrying out said polymerisation in the presence also of a 0.05 to 2.0 percent, based on the weight of the polymer solution, of a secondary alcohol containing from 3 to 5 carbon atoms.

2. A process for the production of solutions of acrylonitrile homopolymers and copolymers containing at least 80 percent by weight of acrylonitrile units, comprising dissolving in an aqueous solution of an inorganic thiocyanate a polymerisable material containing such quantity of acrylonitrile as is necessary to give the desired polymer, and polymerising said polymerisable material in the presence of an azo-catalyst and of 0.05 to 2.0 percent, based on the weight of the polymer solution, of a secondary alcohol selected from the group consisting of isopropyl alcohol, secondary butyl alcohol and secondary amyl alcohol.

3. A process for the production of solutions of acrylonitrile polymers containing at least 80 percent by weight of acrylonitrile units, comprising dissolving a polymerisable material containing such a quantity of acrylonitrile as is necessary to give the desired polymer in an aqueous solution of an inorganic thiocyanate and heating the solution so obtained to a temperature of at least 50° C. in the presence of an azo-catalyst and of 0.05 to 2.0 percent, based on the weight of said solution so obtained, of a secondary alcohol containing from 3 to 5 carbon atoms.

4. A process according to claim 3, wherein the solution of polymerisable material contains, based on the weight of said solution, from 0.2 to 1.5 percent of a secondary alcohol selected from the group consisting of isopropyl alcohol and secondary butyl alcohol.

5. A process according to claim 3, wherein the solution of polymerisable material contains, based on the weight of said solution, from 0.4 to 2.0 percent of secondary amyl alcohol.

References Cited by the Examiner

UNITED STATES PATENTS

| 2,587,465 | 2/1952 | Ham et al. | 260—88.7 |
| 2,923,694 | 2/1960 | Schmidt | 260—29.6 |
| 3,089,748 | 5/1963 | Mogensen et al. | 260—29.6 |

MURRAY TILLMAN, *Primary Examiner.*

W. J. BRIGGS, Sr., *Assistant Examiner.*